Nov. 22, 1966  H. J. MALACHOWSKI  3,286,545
UNIVERSAL POSITIONING MECHANISM
Filed June 24, 1964  5 Sheets-Sheet 1
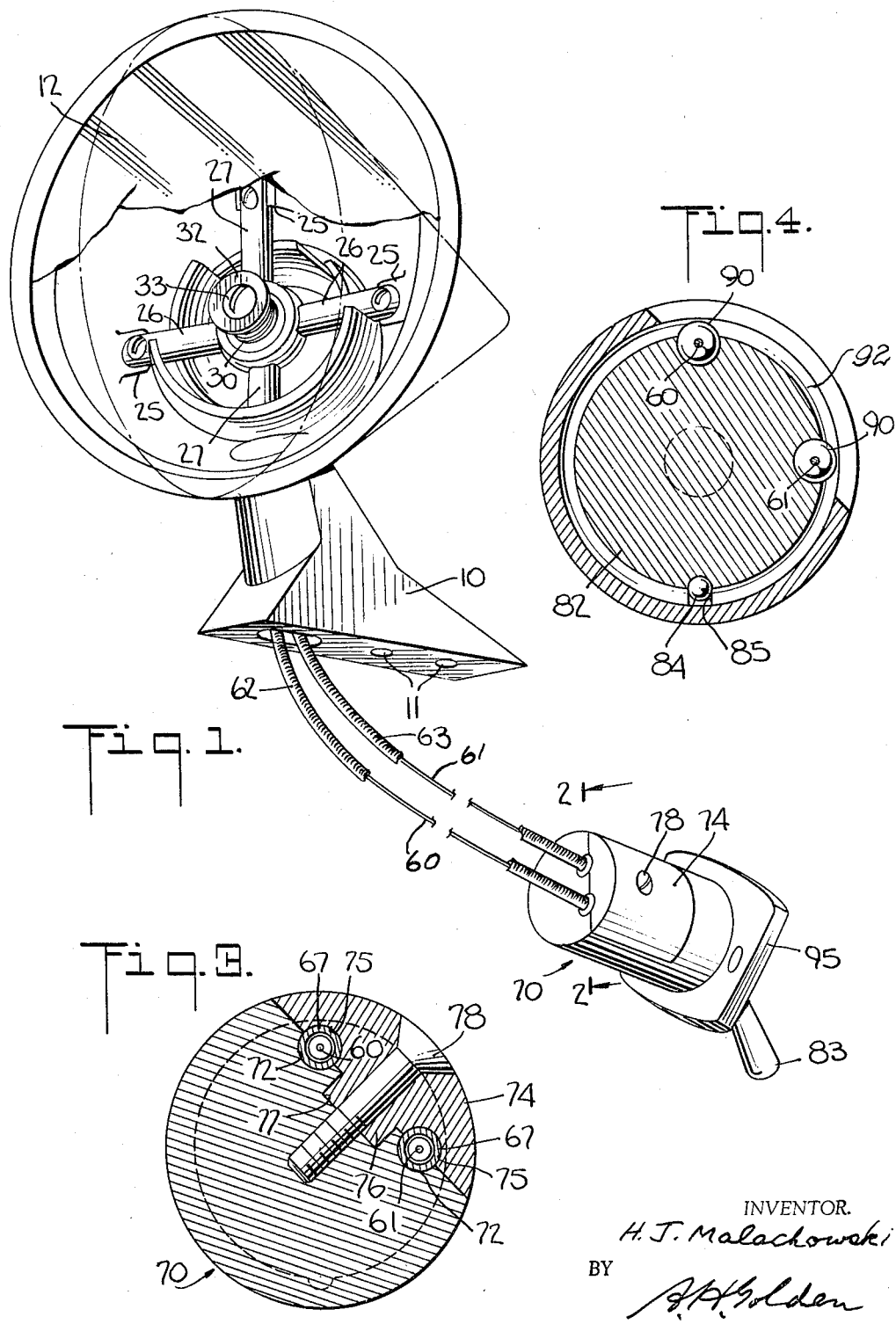
INVENTOR.
H. J. Malachowski
BY
A. H. Golden
ATTORNEY

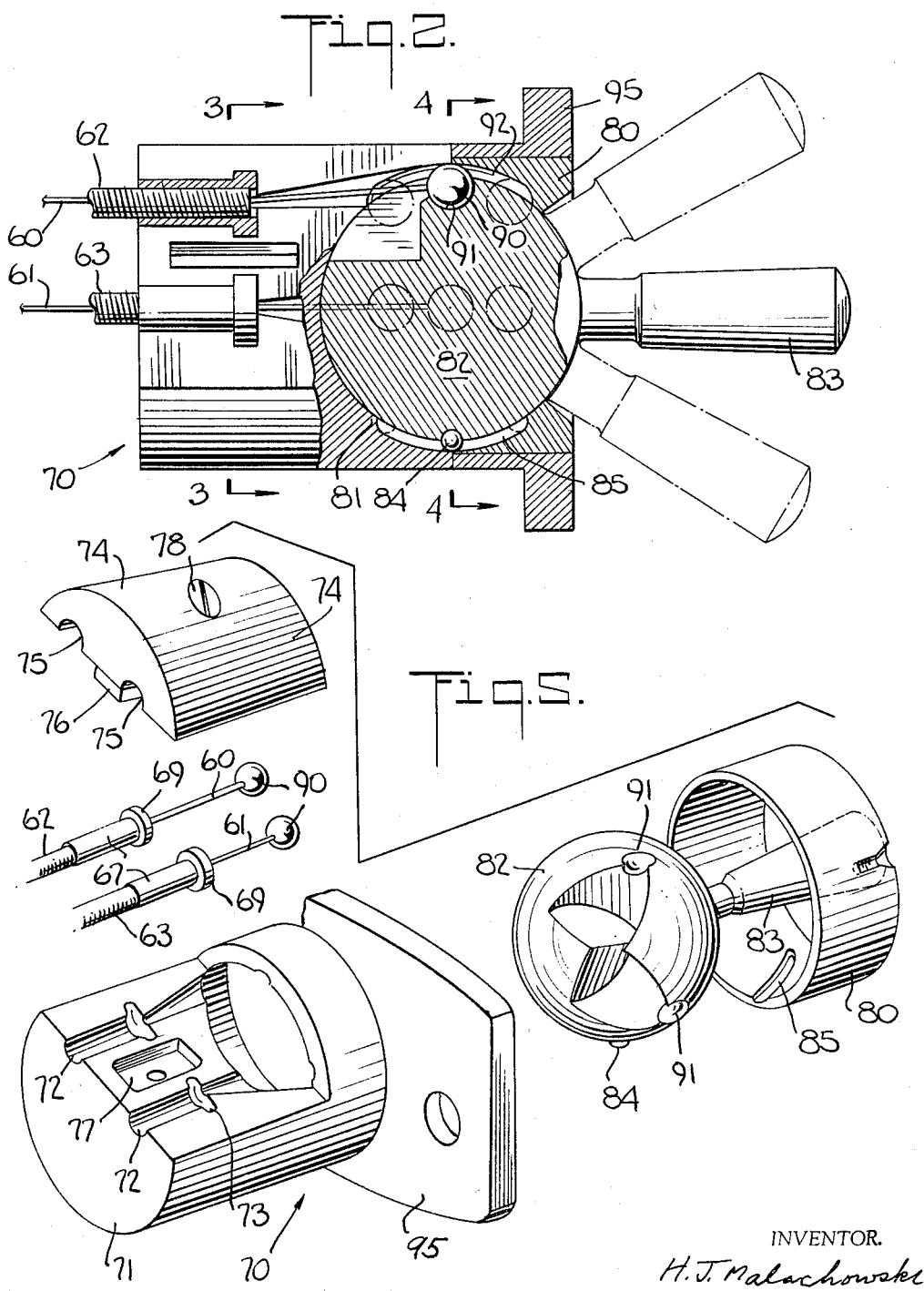

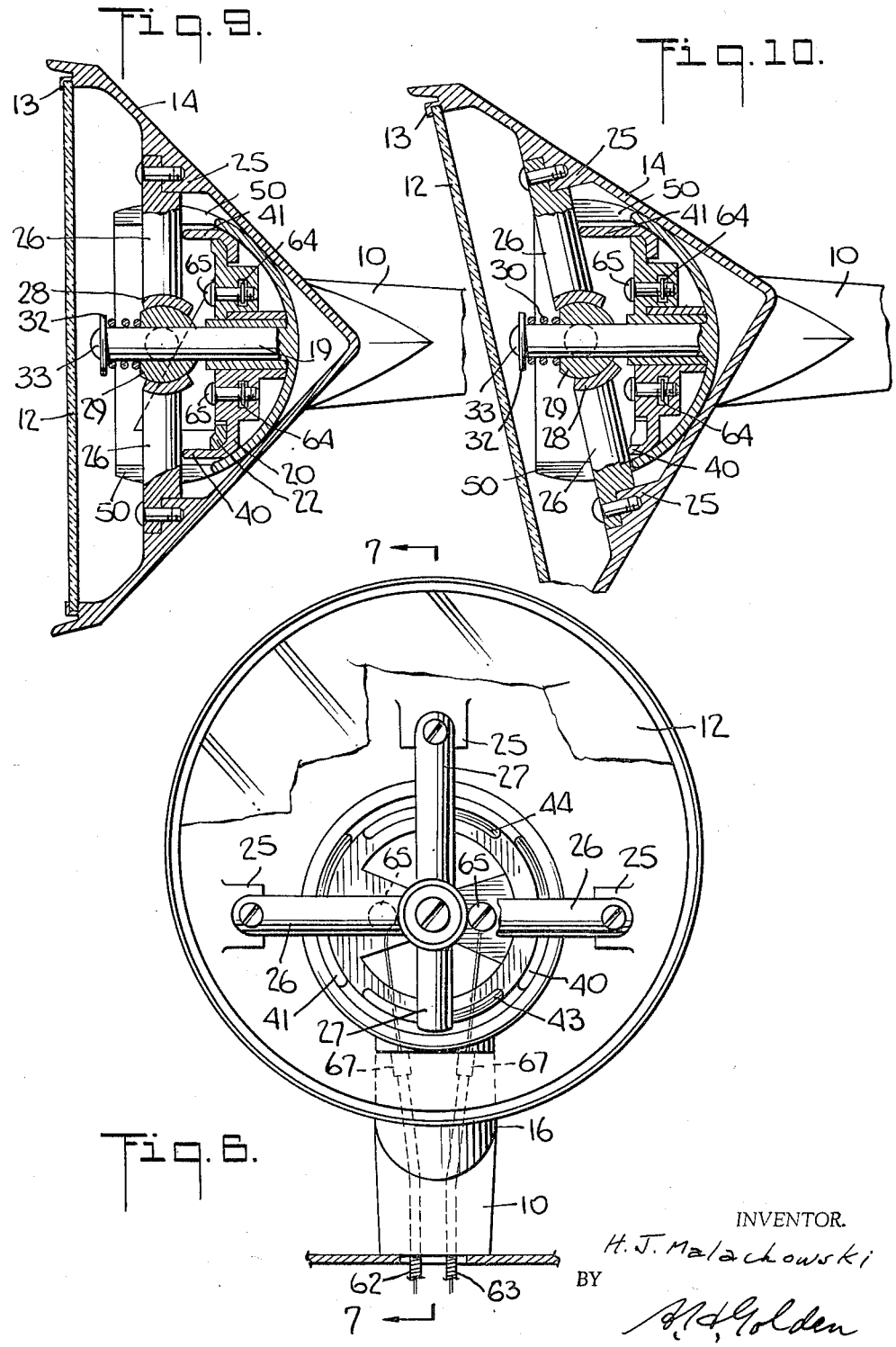

Nov. 22, 1966    H. J. MALACHOWSKI    3,286,545
UNIVERSAL POSITIONING MECHANISM
Filed June 24, 1964    5 Sheets-Sheet 4
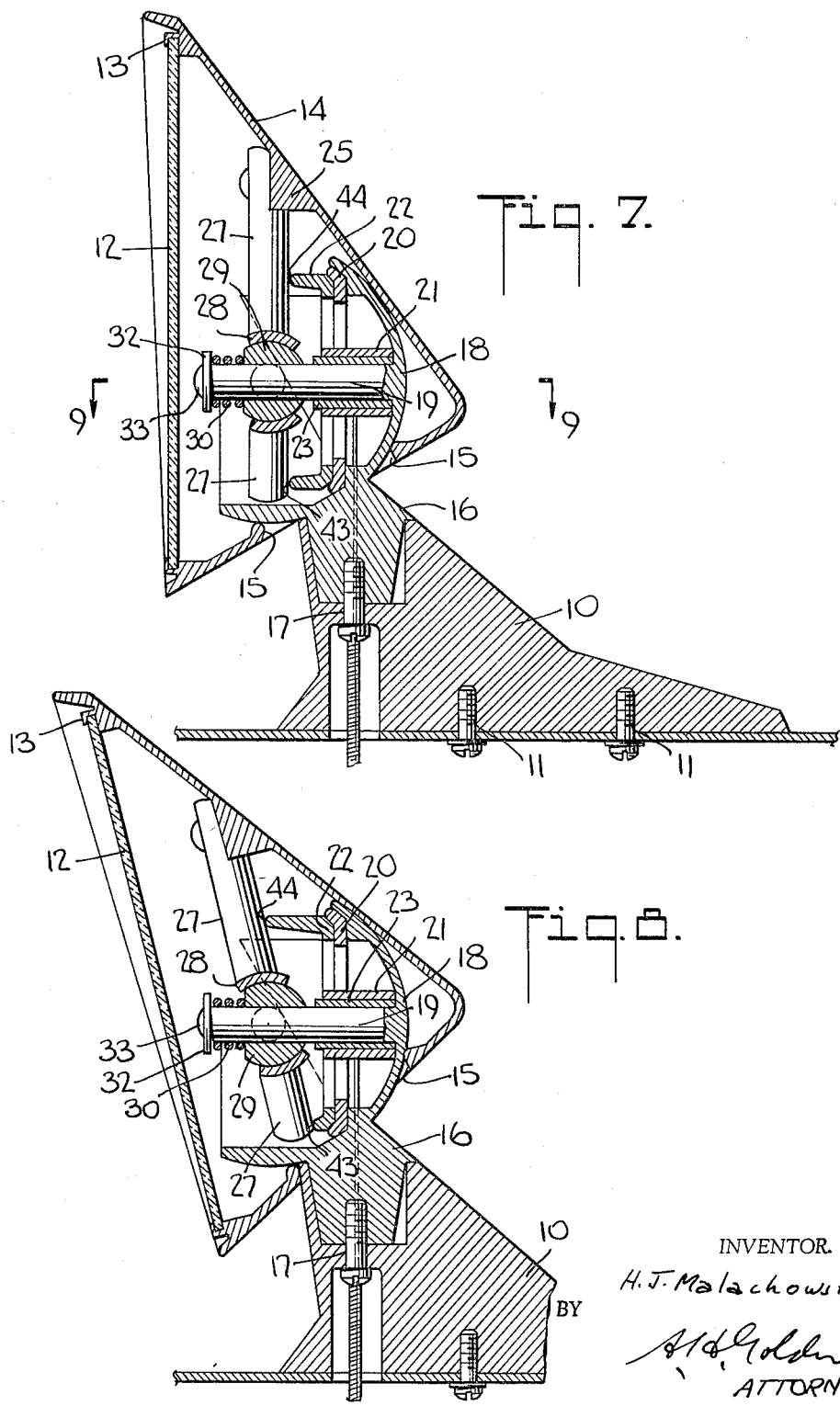
INVENTOR.
H. J. Malachowski
BY
ATTORNEY

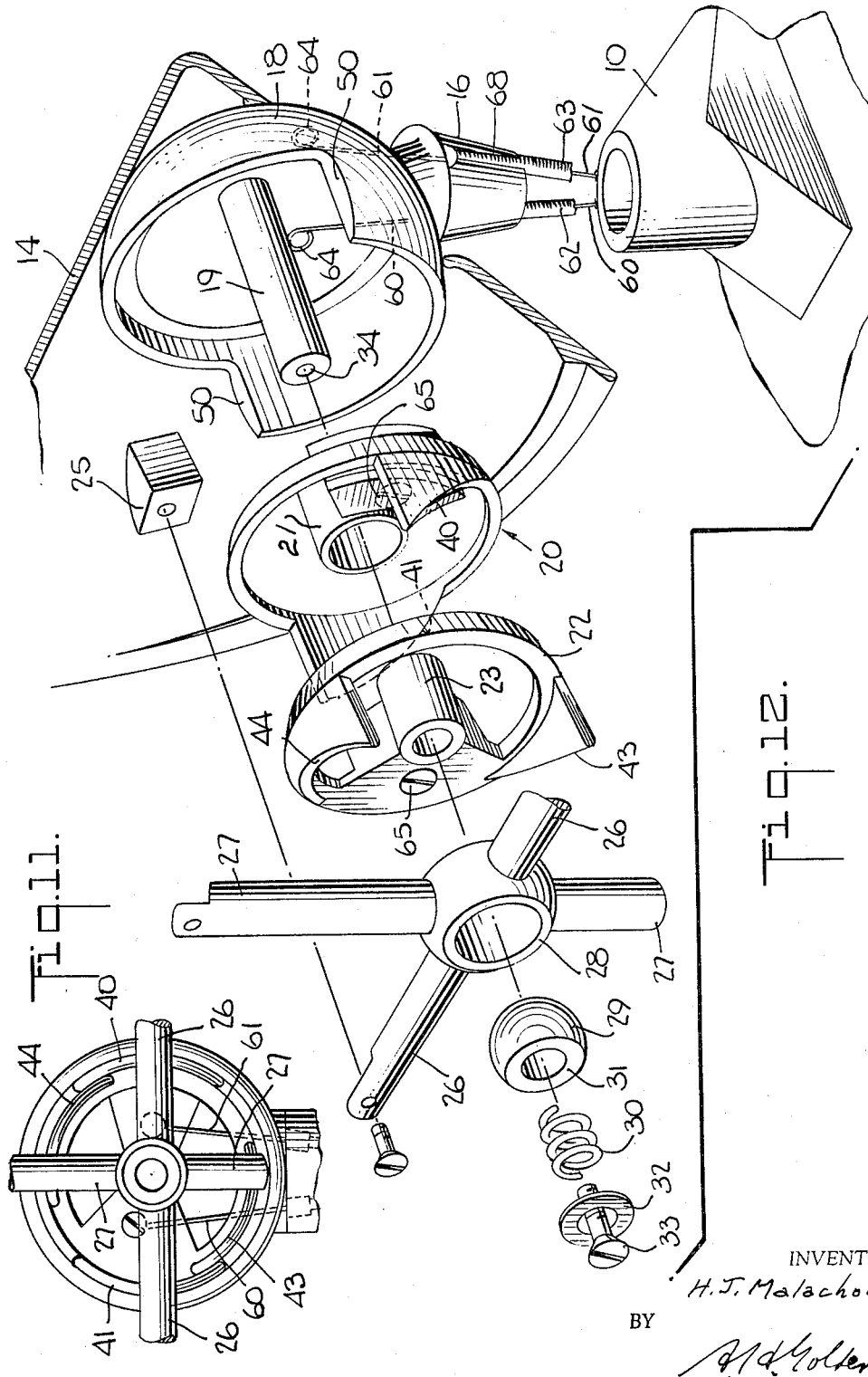

United States Patent Office 3,286,545
Patented Nov. 22, 1966

3,286,545
UNIVERSAL POSITIONING MECHANISM
Handry J. Malachowski, Jersey City, N.J., assignor to Yankee Metal Products Corporation, Norwalk, Conn., a corporation of Connecticut
Filed June 24, 1964, Ser. No. 377,756
17 Claims. (Cl. 74—501)

This invention relates to means for moving an object, such as the rear view mirror of an automobile, through remote control. More particularly, my invention relates to means for moving universally a mirror or similar device through the operation of means remote from the mirror or similar device, with the motion transmission means being in the form of wires. Even more particularly, my invention utilizes wires of the Bowden type that are moved linearly while contributing universal motion to the mirror.

Mechanisms of the particular class are well known in the art, and there are numerous patents showing such mechanisms. However, so far as I know, there has not been contributed to the art a really successful remotely operated mirror or other device, due mainly to the fact that no one has as yet been able to contribute a mechanism in which the Bowden wires receive very simple motion and operate very effectively not only to move the mirror [to which I shall allude in describing my invention] but to hold the mirror in all effective positions. Further, no one in the prior art utilizes wires movable in a particular substantially single direction.

As a feature of my invention, the mirror, in connection with which I shall describe my invention, is universally mounted, and is so constructed, that as it moves on its universal mounting means, it is in covering relation to its mounting means, so as to protect the mounting means in all positions to which the mirror is moved. As a further feature of the invention, the mirror is moved on its mounting means by cams which not only move the mirror on two axes, but also hold the mirror in any position to which it is so moved.

As a further important feature of my invention, the devices that move the mirror on its universal mounting are actuated by Bowden wires which move in very effective relation to the devices actuated thereby. Thus, as a more detailed feature of this invention, the Bowden wires operate at a particular distance from the center of rotation of each of two rotating rings, these rings contributing sufficient motion to the mirror during a relatively slight rotation, permitting most effective action of the Bowden wires in a most effective operating relation to the rings.

As a still further feature of the invention, the cams that impart the universal motion to the mirror operate on parts moving with the mirror and which are supported in a most novel manner for movement in two planes. Thus, I employ bearing means to accept the thrust of the operating mechanism and to hold the mirror positively for movement in the two planes. This makes it possible to hold the mirror rather effectively through yielding means.

As a further feature of the invention, I utilize an extremely novel universally mounted device for contributing motion to the two Bowden wires that I find are all that are required in my invention. This operating device is mounted for universal motion, and through a very simple expedient, is adapted to accept thrust in a most efficient manner so that effective universal motion is possible for transmitting linear motion to the two Bowden wires.

As a more particular feature of this last portion of my invention, I utilize a manually movable ball that is universally mounted, and that has connected to it the two Bowden wires of my invention. Through the provision of a protuberance and a groove connection between the ball and the mounting means for the ball, the protuberance will permit rotation of the ball about the protuberance in all positions of the ball. The protuberance and slot connection will also allow swinging movement of the universally mounted ball in any position to which the ball may first be rotated about the protuberance and slot connection, or in reverse, with the ball rotated about the protuberance to a particular position, the ball may swing in the path determined by the protuberance and slot.

As a further particular feature of the invention, I employ extremely novel means for fixing the Bowden wire sheathes at the ends thereof to the mirror support, and the mounting means for the actuator ball.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention. It is important, therefore, that the claims be regarded as included such equivalent constructions as do not depart from the spirit and scope of my invention, in order to prevent the appropriation of my invention by those skilled in the art.

Referring now to the drawings:

FIG. 1 illustrates the mirror of my invention, the Bowden wires for manipulating the mirror, and the manually operated device positioned remotely from the mirror through which the Bowden wires are actuated;

FIG. 2 is a vertical section along line 2—2 of FIG. 1;

FIGS. 3 and 4 are respectively sections along lines 3—3 and 4—4 of FIG. 2;

FIG. 5 is an exploded view of the parts of my manually operated assembly illustrating the universal mounting for the spherical ball of the assembly, as well as the Bowden wires and the sheathes of those wires;

FIG. 6 is a front view of the mirror with a portion of the mirror glass cut away to illustrate the operating parts of the invention;

FIGS. 7 and 8 are sections taken along the line 7—7 of FIG. 6, illustrating the mirror in two positions to which it may be manipulated through tilting about a horizontal axis;

FIGS. 9 and 10 are sections taken along lines 9—9 of FIG. 7 illustrating the manner in which the mirror may be pivoted to two positions about a vertical axis;

FIG. 11 shows the positioning of the two Bowden wires relatively to the mirror assembly when the Bowden wires have been displaced relatively to one another from the position of FIG. 6; and FIG. 12 is an exploded view of the parts forming the mirror assembly and which are shown in assembled position in FIGS. 6, 7 and 8.

Referring now more particularly to the drawings, reference numeral 10 indicates the base of the mounting member for the mirror, this base being adapted to be secured to a fender or to the body of an automobile through screws utilizing bores 11, as best seen in FIG. 1. The mirror glass is designated by reference numeral 12, in FIGS. 9 and 10, and is there shown as secured at 13 in a conventional manner to a mirror body 14.

This mirror body 14, as is best seen in FIG. 12, as well as FIGS. 7 and 8, has an opening 15 at its bottom so as to fit about the mirror mounting member 16. This member 16 can be formed integrally with base 10, but actually is separate therefrom as seen in FIG. 7, being preferably secured to base 10 by one or more screws 17. As will appear presently, the mirror body 14 may move freely relatively to member 16 and base 10, while covering member 16 and the operating mechanism carried thereby.

The mounting member 16 has a concave integral portion 18 from which extends an integral pin 19. At this point, it will be well to emphasize that the outer surface of concave portion 18 is formed convex so that the circular surface of the mirror body 14 outlining opening 15 will always be juxtaposed to the outer convex surface, and thus prevent the entrance of water, dirt, etc. into the operating mechanism. The pin 19, and the shapes of the parts 16, 18 are best seen in exploded view FIG. 12, as well as sections FIGS. 7, 8, 9 and 10.

A cam ring 20 formed with a sleeve 21 as assembled to the pin 19 through movement into the position illustrated in FIG. 7. Thereafter, a second similar cam ring 22, is is inserted with its sleeve 23 directly in contact with pin 19, and within the sleeve 21. It is obvious from the drawings, that part 18 is formed to accommodate and support the cam rings 20 and 22 for rotation about the shaft 19, and therefore relatively to the mounting members 16, 18.

The mirror body has three lugs 25 to which may be screwed ends of two generally horizontal cross bars 26 and the upper end of the upper of two vertical cross bars 27 (FIGS. 1 and 12). These cross bars when thus secured to the mirror body 14 become integral therewith. It will be noted that no lug is provided for securing the lower vertical bar 27, three lugs 25 being sufficient for the purpose. The cross bars 26, 27 are preferably formed integral with a central bearing member 28 through which the mirror is universally mounted.

For cooperating with the bearing member 28, I utilize a bearing ball 29 having a bore 31 whereby it slides on pin 19. Ball 29 fits within the bearing member 28, as well seen in FIGS. 7, 8, 9 and 10, the relationship between elements 28 and 29 being of course well illustrated also in FIG. 12. A spring 30 fits about pin 19 and presses against the ball 29, and is held in pressure relation to ball 29 through a washer 32 and a screw 33 entering a threaded bore 34 of the pin 19. Obviously, the ball 29, bearing 28, the mirror body 14 and the cam rings 20 and 22, will all be held yieldingly on pin 19 and pressed to a limit position relatively to part 18.

It is now obvious that the shaft 19 well supports the two cam rings 20 and 22 for rotation thereon, with some effective friction resisting rotation. The cam ring 20 has a cam 40 and a further cam 41, best seen in the exploded view FIG. 12, as well as FIGS. 9 and 10. These cams are in opposed relation and are adapted to bear against the horizontal bars 26 secured to the mirror body 14. It will be obvious that as the cam ring 20 rotates, the high point of one cam will be against one of the bars 26, whereas the lower portion of the other cam will be against the other bar 26. In the assembly of the parts, the spring 30, pressing through the ball 29 against the bearing 28 holds the two horizontal bars 26 securely but yieldingly against the two cams 40 and 41, the effectiveness of which will be emphasized below.

The cam ring 22 is similarly formed with a pair of operating cams 43 and 44. These cams coact with the vertical bars 27 of the mirror body 14, which are also pressed by the spring 30 through the ball 29 and bearing 28 against the two cams 43 and 44. Further, a low point of one cam moves opposite one bar just as a high point of the other cam moves opposite the other bar 27. Therefore, as the cam ring 22 rotates, the bars 27 will be moved with the bearing 28 relatively to the ball 29, all as will be rather apparent.

Those skilled in the art will appreciate that through the utilization of the cam rings and their cams as both thrust accepting and operating portions for the mirror body through its bars 26 and 27, I have contributed very effective positioning means for the bars 26 and 27. At the same time, through the yielding action of the spring 30 and the ball 29, I have an extremely effective but nevertheless yielding mounting for the operating cam rings 20 and 22, these cam rings together with the cross bars 26 and 27 being all held yieldingly in the same operating relation regardless of the position of the bars 26 and 27. This all results in a very effective operating assembly without requiring precision parts.

Referring now even more particularly to FIG. 12, it will be noticed that the portion 18 from which extends the pin 19, has a pair of shelves 50, these shelves being so positioned as to support thereon the two bars 26 when the cam rings and bars have been assembled relatively to the pin 19. Through this arrangement, any motion that is contributed to the bars 27 by the cams 43 and 44 of cam ring 22 merely rotates the bars 26 about their inner axis, with but slight frictional pressure between the bars 26 and shelves 50. In other words, shelves 50 support the bars 26 every effectively, and yet allow vertical swinging movement of the bars 27, and naturally, the effective movement of the mirror body 14 therewith.

When the bars 26 are moved through rotation of cam ring 20, and by means of the cams 40 and 41, the bars 26 will merely slide bodily on the shelves 50, while at the same time supported by the shelves 50. It will thus be seen, that the shelves 50 are extremely effective in the guidance and support of the bars 26, 27 and the mirror body 14.

For rotating the two cam rings 20 and 22, I utilize a pair of Bowden wires designated by reference numerals 60 and 61, each encased respectively in a sheath 62, 63, all as is well shown in FIGS. 1 and 2. The ends of the Bowden wires 60 and 61 that terminate in the mirror assembly are formed with loops 64, as probably best shown in FIG. 12. The loops 64 in turn coact with screws or bolts 65 carried by the cam rings 20 and 22. Thus, the screw 65 of cam ring 20 cooperates with the loop 64 of the Bowden wire 61 to secure the Bowden wire 61 to the cam ring 20 so that a push or pull of the Bowden wire 61 will rotate cam ring 20. Similarly, Bowden wire 60 is secured by a screw 65 to the cam ring 22. It may be well to indicate further that each of the cam rings is formed with an internal opening as is probably best illustrated in FIGS. 9 and 10, into which the loops 64 may enter to be secured by the screws 65.

The ends of the sheathes 62 and 63 in which the Bowden wires 60 and 61 are housed are equipped with shouldered ferrules 67. Those ends of the sheathes 62 and 63 terminating at the mirror have their ferrules 67 secured in the part 16 which is in turn placed in the mounting member 10 as earlier described. For this purpose, the part 16 is formed with two peripheral grooves 68, as best illustrated in FIG. 12. In this manner, the upper ends of the two sheathes 62 and 63 are fixed relatively to the mirror base, so that the Bowden wires 60 and 61 may move relatively thereto to actuate the mirror.

The other ends of the Bowden wires 60 and 61 terminate at a manually operated assembly designated generally by reference numeral 70 in FIGS. 2 and 5. This assembly utilizes a housing portion 71, formed with a pair of grooves 72, into which may be placed the ferrules 67. Shoulders 69 of the ferrules fit into slots 73 which extend from grooves 72. Thereafter, a cap 74 may be applied to body 71 to complete the assembly, the cap being formed with matching grooves 75, and also with slots matching the slots 73. A centering lug 76 is formed on the cap 74 and is adapted to fit into the slot 77. A fastening screw 78 is utilized to hold the cap 74 in place. It is quite obvious that when the ferrules 67 are placed in the grooves 72 with their shoulders 69 fitting into the slots 73, the cap 74 will, after being applied in position as illustrated in FIG. 1, hold the Bowden wire sheathes securely against movement relatively to assembly 70.

The assembly 70 includes a universal mounting formed by the coaction of a forward portion 80, and a surface 81, formed on the part 71, earlier described. Parts 71 and 80 may be held assembled in any suitable manner, and this may include a decorative plate 95. Within the spherical bearing opening formed by the surfaces 81 and part 80, I mount a ball 82 which is probably best seen in FIGS. 2 and 5. This ball has integral therewith a finger piece 83, and a lug 84. The lug 84 is adapted to slide in a groove 85 formed partially in the portion 80 and partially on the part 71 and in surface 81. It will be obvious that because of the slot and lug cooperation of lug 84 and slot 85, the ball 82 can pivot or swing at all times on the pivot bearing contributed by the lug 84, or may slide bodily with the lug 84 relatively to the slot 85. There can be no bodily rotation about any diameter of the ball 82 other than that diameter passing through the lug 84. In this way, rotation bodily of the ball 82 in the axis of handle 83 cannot be contributed by the handle 83. Because of the particular construction, the lug 84 well accepts all forces that may be contributed by the handle 83 so that it is possible to manipulate the ball 82 freely in any desired manner through handle 83, and to impart simple thrust and pull to wires 61 and 62 as will appear presently.

The two Bowden wires 60 and 61 terminate each in a connector ball 90, and each connector ball 90 rides in a ball coacting depression 91 in the large actuator ball 82. Each connector ball 90 is naturally larger than its depression 91, so as to extend outwardly from the periphery of the actuator ball 82 and into a control depression 92 formed in the mounting body resulting from the assembly of parts 71, 74 and 80. Through the particular arrangement, it is very easy to assemble the connector balls 90 to the actuator ball 82, and simultaneously to assemble the ferrules 67 to the portion 71 of the assembly 70. Further, upon completion of the assembly, as shown in the drawings, it will readily be appreciated that movement of the actuator ball 82 will contribute longitudinal motion to the Bowden wires 60 and 61. This movement will be limited by control depression 92 as well as by groove 85 and lug 84. Further, differential motion will be imparted to the two wires 60 and 61 because of the particular spacing of the balls 90 on the periphery of actuator ball 82. It will further be noted that ball 82 is cut away to allow movement of wires 60, 61 without binding.

It will further be appreciated that rotation of the spherical ball 82 in the axis of the handle 83 will not be possible, due to the action of the lug 84, so that only effective linear movement of the Bowden wires 60 and 61 is possible. It will be well, incidentally, to indicate that the particular lug and groove arrangement 84, 85 may be varied very considerably, and that the construction I have illustrated is merely one of several that may be adopted to get the results set forth.

I do believe that those skilled in the art will now appreciate how a very simple manipulation of the ball 82 by the handle 83 will bring about simple linear movement of the wires 60 and 61, which will in turn, through the very simple arrangement of the screws and loops 64, 65, rotate the two cam rings 20 and 22. This motion will, in turn, move the mirror about its universal mounting through the bars 26 and 27, with the moving forces well accepted by the shelves 50. Further, the cams are inherently adapted to hold the bars in any position in which the cams move the bars, so that very considerable stability of the mirror in all of its positions is effected. I believe the scope and importance of my very considerable contribution to the art will now be fully appreciated by those skilled in the art.

I now claim:

1. In a combination of the class described, a mirror, means mounting said mirror for universal movement, a pair of bars secured to said mirror and positioned at right angles to one another with a portion of each bar at each side of said means mounting said mirror for universal movement, a pair of cams for each of said bars, means for moving said cams in opposed relation with one cam of each pair coacting with its bar at one side of said mounting means and the other cam coacting with the other side of said bar, whereby said cams move said bars and said mirror on the universal mounting while also holding said bars stationary when said cams are stationary.

2. In the combination of claim 1, said means mounting said mirror for universal movement comprising a socket having an internal spherical bearing surface and an outer surface from which each bar portion of the two pairs of bars extend, there being a shaft traversing the cams and about which the cams rotate, said shaft also passing through an opening in said socket so that said socket encompasses said shaft, a ball fitted into said socket and having a bore whereby it is mounted for sliding motion on said shaft so that endwise movement of said ball on said shaft moves said socket member therewith relatively to said shaft to bring said bars against said cams.

3. In a combination of the class described, a mirror, a pair of bars secured to said mirror and positioned at right angles to one another in crossed relation, bearing means fixed to said bars at their meeting point and mounting said mirror for universal movement, a pair of cams for each of said bars, means for moving said cams of each pair simultaneously in opposed relation with one cam of each pair coacting with its bar at one side of said mounting means and the other cam of each pair at the other side of said bar, whereby said cams move said bar and said mirror on the universal mounting while also holding said bars stationary when said cams are stationary.

4. In a combination of the class described, a mirror, means mounting said mirror for universal movement, a pair of bars secured to said mirror and positioned at right angles to one another with a portion of each bar at each side of said means mounting said mirror for universal movement, a pair of cams for each of said bars, means for moving said cams in opposed relation with one cam of each pair coacting with its bar at one side of said mounting means and the other cam of said pair coacting with the other side of said bar, whereby said cams move said bars and said mirror on the universal mounting while also holding said bars stationary when said cams are stationary, and an abutment for each side of one of said bars to support said bar for bodily sliding on said abutments and for rotation of said bar in its axis while resting on said abutments.

5. In a combination of the class described, a mirror, a base, means mounting said mirror for universal movement on said base, a bar secured to said mirror mounting means and lying in a horizontal plane with a portion of said bar at each side of said means mounting said mirror for universal movement, a pair of cams for said bar, means for moving said cams in opposed relation with one cam coacting with said bar at one side of said mounting means and the other cam with the bar at the other side of said mounting means, whereby said cams move said bar and said mirror on the universal mounting while also holding said bar stationary when said cams are stationary, and abutments for said horizontal bar to support said bar for bodily sliding motion on said abutments while also supporting said bar portions for rotary axial motion relatively to said abutments.

6. In a combination of the class described, a mirror, a base, means mounting said mirror for universal movement on said base, a bar secured to said mirror mounting means and lying in a horizontal plane with a portion of said bar at each side of said means mounting said mirror for universal movement, a similar bar lying in vertical plane and similarly related to said mirror and mounting means, a pair of cams for each of said bars, means for moving said pairs of cams in opposed relation with one cam of each pair coacting with its bar at one side of said mounting means and the other cam with its bar at the other side of said mounting means, whereby said cams move said bars and said mirror on the universal mounting while also holding said bars stationary when said cams are stationary, and abutments for said horizontal bar to support said bar for bodily sliding motion on said abutments while also supporting said bar portions for rotary axial motion relatively to said abutments.

7. In a combination of the class described, a mirror body, means mounting said mirror body for universal movement, a pair of bars secured to said mirror and positioned at right angles to one another with a portion of each bar at each side of said means mounting said mirror for universal movement, a pair of operating rings, means mounting both said rings for rotation about an axis passing through said universal mounting means, a pair of opposed complementary cams integral with each ring and coacting with opposed ends of each of said bars, a wire secured to each ring at a point spaced from its axis of rotation, and means for moving both of said wires linearly simultaneously whereby to rotate both rings simultaneously.

8. An actuator for a pair of Bowden wires comprising a ball, means mounting said ball for universal movement, a handle extending from said ball and through which said ball is moved on its universal mounting, and a protuberance held against substantial displacement bodily relatively to said ball and extending from said ball into a groove in said mounting means whereby to prevent rotation of said ball bodily relatively to said universal mounting in the axis of a line passing through the diameter of said ball, except when said line passes also through the center of said protuberance.

9. An actuator for a pair of Bowden wires comprising a ball, means mounting said ball for universal movement, a protuberance on said ball held against substantial displacement bodily relatively to said ball and extending into a groove in said mounting means for controlling the movement of said ball on said mounting means whereby to provide a pivot axis for rotation of said ball bodily relatively to said universal mounting in the axis of a line passing through the diameter of said ball and also through said protuberance, while permitting swinging of said ball with the protuberance in said groove following the groove as a guide.

10. An actuator for a pair of Bowden wires comprising a ball, means mounting said ball for universal movement, and a protuberance and groove connection between said ball and said mounting means formed by means on said ball and said mounting means for controlling the movement of said ball on said mounting means, said protuberance being substantially immovable bodily relatively to the element on which it is carried.

11. An actuator for a pair of sheathed Bowden wires comprising an operating ball, a base, means mounting said operating ball for universal movement on said base, a protuberance extending from said operating ball and fitting into a groove in said mounting means whereby to prevent rotation of said operating ball bodily relatively to said universal mounting in the axis of a line passing through the diameter of said operating ball, except when said line passes also through the center of said protuberance, a small ball at the end of each wire fitted into a depression in said operating ball and extending into a shallow depression of said base whereby said operating ball moves said small balls and wires as it in turn is moved relatively to said base, a sheath for each of said wires, and means fixing said sheaths against movement relatively to said base.

12. An actuator for a pair of sheathed Bowden wires comprising an operating ball, a base, means mounting said operating ball for universal movement on said base, a small ball at the end of each wire fitted into a depression in said operating ball and extending into a shallow depression of said base whereby said operating ball moves said small balls and wires as it in turn is moved relatively to said base, a sheath for each of said wires, and means fixing said sheaths against movement relatively to said base.

13. An actuator for a pair of sheathed Bowden wires comprising an operating ball, a base, means mounting said operating ball for universal movement on said base, a protuberance and groove connection between said mounting means and operating ball whereby to prevent rotation of said operating ball bodily relatively to said universal mounting in the axis of a line passing through the diameter of said operating ball, except when said line passes also through the center of said protuberance, means at the end of each wire fitted into a depression in said operating ball and extending into a shallow depression in said base whereby said operating ball moves said wires linearly as it in turn is moved relatively to said base, a sheath for each of said wires, and means fixing said sheaths against movement relatively to said base.

14. In a combination of the class described, a mounting member including a shaft, a pair of cam rings rotatably mounted on said shaft, a mirror body having positioning portions to be applied against both said cam rings whereby to be moved by said cam rings, a universal bearing part integral with said positioning portions and having a central spherical opening considerably larger than said shaft for encompassing said shaft, a ball slidably fitted on said shaft and having an exterior bearing surface fitting into said spherical opening to form a universal bearing for said mirror body, and means yieldingly pressing said ball endwise of said shaft toward said cam rings whereby to move therewith said universal bearing part to bring said positioning portions against said cam rings whereby the movement of said cam rings effects movement of said positioning portions and universal bearing part relatively to said ball and shaft.

15. In a combination of the class described, a mounting member including a shaft, a pair of cam rings rotatably mounted on said shaft, a mirror body adapted to fit about said mounting member and having crossed bars to be applied against said cam rings whereby to be moved by said cam rings, a universal bearing part integral with said bars where they cross and having a central spherical opening considerably larger than said shaft for encompassing said shaft, a ball slidably fitted on said shaft and having an exterior bearing surface fitting into said spherical opening to form a universal bearing for said mirror body, and means yieldingly pressing said ball endwise of said shaft toward said cam rings whereby to move therewith said universal bearing to bring said bars against said cam rings.

16. An actuator for a pair of Bowden wires comprising a ball mounted for universal movement within a cavity, said cavity having surfaces defining a spherical bearing for the outer surface of said ball, and a protuberance and groove connection formed by cooperating means on said ball and a surface of said cavity for controlling the movement of said ball in said cavity whereby to prevent rotation of said ball bodily relatively to said cavity in the axis of a line passing through the diameter of said ball, except when said line passes also through the center of said protuberance, said protuberance being held against substantial displacement bodily relatively to the element to which it is applied.

17. An actuator for a pair of Bowden wires comprising a ball, a mounting member for said ball having a cavity formed with surfaces defining a spherical bearing for mounting said ball for universal movement, and a protuberance and groove connection formed by cooperating means on said ball and said cavity for controlling the movement of said ball on said mounting means, said protuberance being held against substantial displacement bodily relatively to the element to which it is applied.

References Cited by the Examiner

UNITED STATES PATENTS

| 3,046,841 | 7/1962 | Kawecki | 74—501 X |
| 3,104,067 | 9/1963 | Stiffel. | |
| 3,191,455 | 6/1965 | Fuqua et al. | 74—501 |

FOREIGN PATENTS 1,289,527  2/1962  France.

MILTON KAUFMAN, *Primary Examiner.*